(No Model.)
B. GRUHL.
CIRCULAR SHEARS FOR CUTTING SHELLS AND TUBES.
No. 374,151. Patented Nov. 29, 1887.
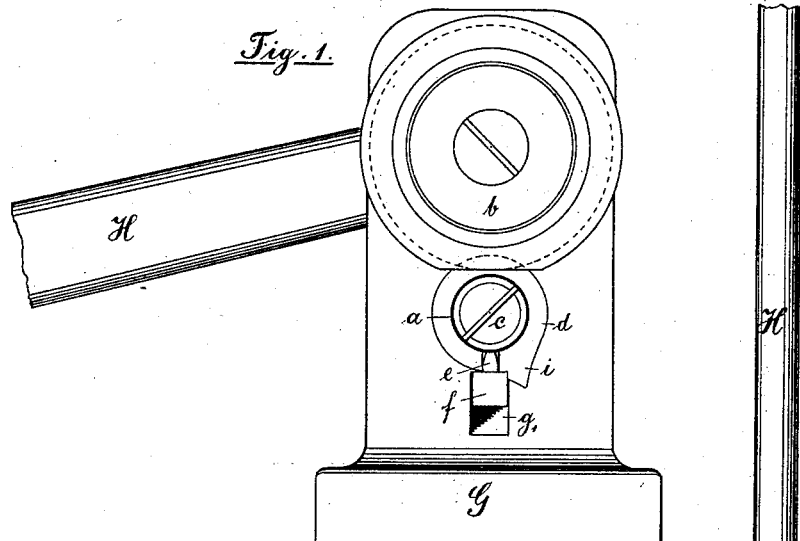
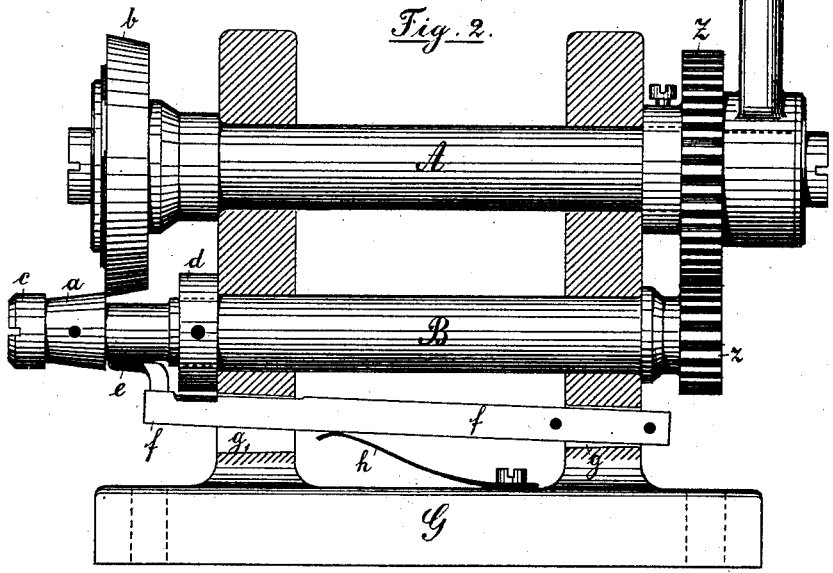

UNITED STATES PATENT OFFICE.

BERNHARD GRUHL, OF DRESDEN, SAXONY, GERMANY.

CIRCULAR SHEARS FOR CUTTING SHELLS AND TUBES.

SPECIFICATION forming part of Letters Patent No. 374,151, dated November 29, 1887.

Application filed August 16, 1887. Serial No. 247,100. (No model.) Patented in Germany January 16, 1887, No. 40,493.

*To all whom it may concern:*

Be it known that I, BERNHARD GRUHL, of the city of Dresden, in the Kingdom of Saxony, German Empire, have invented certain new and useful Improvements in Circular Shears for Cutting Annular Pieces from Cartridge-Shells and Drawn-Metal Tubes, (patented to me in Germany on the 16th of January, 1887, No. 40,493,) of which I declare the following to be a specification.

My invention relates to improvements in circular shears for cutting annular pieces from cartridge-shells and drawn-metal tubes.

In order to operate on drawn-metal or seamless tubes with closed ends—such as cartridge-shells, tips for umbrellas, sticks, and the like—for cutting off open tubes at a right angle to the longitudinal axis, or cutting the same up into ferrules, pipe-rings, and other purposes, the following methods are generally employed: (*a*) The same are turned off in a lathe, (*b*) are cut off into pieces by means of circular-saws, (*c*) are cut off on the well-known apparatus for cutting gas-tubes, or (*d*) when the tubes have closed ends, are cut off when the drawing punch or mandrel is still in the tube by means of a piston, the cutting-surface of which protrudes a distance corresponding to the thickness of the bottom of the tube.

All these methods have proved disadvantageous, as given below. (*a*.) This is manual labor, is too slow and consequently too expensive. (*b*.) The edges are not perfectly rectangular to the longitudinal axis, as the saw and even the guides are liable to incline to one side, and besides this a great deal of burr is made. (*c*.) The gas-pipe cutter is not a cutter in the proper sense of the word, but presses the metal toward the center of the tube and thereby partially closes the said tube. (*d*.) By this process the metal is forced over the edge of the drawing-punch and torn off, so that the edges are fringing or full of burr at the lower edges.

Figure 1 is a side view of the cutters and supporting-frame. Fig. 2 is an edge view of the cutters, showing their shafts in side elevation and the supporting-frame partially in section.

Now, I have invented a method by employing which all the disadvantages recited above are avoided, in order to carry out which said method I employ two circular cutters of unlike diameters. The tube or pipe to cut is passed over the smaller cutter, which can, however, only be done when the straight surface of the larger cutter, $b$, stands immediately over the smaller cutter, $a$, Fig. 1. A toothed wheel, Z, with thirty-six teeth, is fixed to the driving-shaft A, which carries the hand-lever H and the large cutter $b$. This wheel Z gears into a small wheel, $z$, with sixteen teeth, which is mounted on the lower shaft, B. If, now, a semi-revolution is given to the larger wheel, Z, on the driving-shaft A, the smaller wheel, $z$, and with it the smaller cutter, $a$, shaft B, the tube to be cut, and the adjusting-ring $d$ will be caused to make more than one full revolution by the distance of two teeth on the smaller wheel. The head of the bolt $c$, which is of like diameter with the smaller cutter, $a$, and corresponds with the interior diameter of the closed or open tube to be operated on, serves as guide for the same, so as to insure a perfectly rectangular cut, and with closed tubes can also serve as stop to regulate the length.

In cutting open tubes the adjustable ring $d$ serves as stop.

In order to tear the cut-off annular pieces of metal open and readily remove the same from the machine, I employ a hook or hooked knife, $e$, fixed to the lever $f$, which said lever is guided in openings or slots $g\, g'$ in the standards of the frame G. The spring $h$ presses the hooked knife $e$ into a groove in the shaft B between the small cutter and the adjustable ring during the operation of the said cutters. As soon as the cut is completed, the lever $f$ is depressed by a tappet, $i$, mounted on the adjustable ring $d$, and the hooked knife forced out of the groove in the shaft B, and in this manner tears or cuts open the piece of metal cut off the tube, so that the said piece can be readily removed.

Having now particularly described and ascertained the nature of my invention and the manner in which the same is to be carried into effect, I declare that what I claim, and desire to secure by Letters Patent, is—

1. In circular shears for cutting off tubes, the combination of the circular cutters $a\, b$, of different diameters and rotating with unlike rapidity, substantially as shown and described.

2. In circular shears for cutting off tubes, removing one part of the cutting-surface of the circular cutter b, so as to permit the introduction of the tube to be cut, substantially as shown and described.

3. In circular-shears for cutting off closed or open tubes, a hooked knife, e, for tearing or cutting through the piece of metal removed from the tube, which said hooked knife enters the end of the tube and is depressed by means of a lever, f, and tappet i, substantially as shown and described.

In witness whereof I have hereunto signed my name in the presence of two subscribing witnesses.

BERNHARD GRUHL.

Witnesses:
OTTO WOLFF,
PAUL DRUCKMÜLLER.